(12) United States Patent
Dang (10) Patent No.: US 7,876,708 B2
(45) Date of Patent: Jan. 25, 2011

(54) METHOD AND APPARATUS FOR DISCOVERING NETWORK SERVICE PROVIDERS

(75) Inventor: Shujun Dang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 11/962,899

(22) Filed: Dec. 21, 2007

(65) Prior Publication Data

US 2008/0095073 A1 Apr. 24, 2008

Related U.S. Application Data

(63) Continuation of application No. PCT/CN2006/001521, filed on Jun. 30, 2006.

(30) Foreign Application Priority Data

Jul. 1, 2005 (CN) .................. 2005 1 0035627

(51) Int. Cl.
*H04L 12/28* (2006.01)
(52) U.S. Cl. .................................. 370/254
(58) Field of Classification Search .................. None
See application file for complete search history.

(56) References Cited

U.S. PATENT DOCUMENTS

| 5,594,782 | A | | 1/1997 | Zicker et al. |
| 5,761,618 | A | * | 6/1998 | Lynch et al. ............... 455/419 |
| 6,125,283 | A | | 9/2000 | Kolev et al. |
| 6,795,706 | B1 | * | 9/2004 | Cheng ...................... 455/436 |
| 2002/0092026 | A1 | * | 7/2002 | Janniello et al. .............. 725/86 |

(Continued)

FOREIGN PATENT DOCUMENTS

CN 1581901 A 2/2005

(Continued)

OTHER PUBLICATIONS

Adrangi et al., "Service Identity Delivery Mechanism," IEEE 802.16's Network Management Task Group, 1-3: Jan. 24, 2005 http://grouper.ieee.org/groups/802/16/netman/contrib./C80216g-05_003.pdf.

(Continued)

*Primary Examiner*—Chirag G Shah
*Assistant Examiner*—Jenkey Van
(74) *Attorney, Agent, or Firm*—Leydig, Voit & Mayer, Ltd.

(57) ABSTRACT

The present invention discloses a method and a corresponding apparatus for discovering NSPs. The method includes: transmitting, by network-side, information about NSPs supported by the current NAP; transmitting, by the network-side, first change information about NSPs supported by the NAP at a fixed period; obtaining, by a CPE, the first change information about the NSPs supported by the NAP accessible at a current position when accessing a network; determining whether the first change information is consistent with stored change information about NSPs supported by the NAP, if it is, obtaining stored information about NSPs supported by the NAP, otherwise, obtaining information about NSPs supported by the NAP transmitted by the network-side; and adding the obtained information about the NSPs as information about available NSPs discovered. The present invention can reduce extra occupancy of air interface resources and effectively reduce time consumption in the process of network discovering and selecting.

14 Claims, 6 Drawing Sheets

U.S. PATENT DOCUMENTS

| | | |
|---|---|---|
| 2003/0061364 A1 | 3/2003 | Banerjee et al. |
| 2004/0181692 A1* | 9/2004 | Wild et al. ............... 713/201 |
| 2005/0197125 A1* | 9/2005 | Kang et al. ............... 455/439 |
| 2007/0147315 A1 | 6/2007 | Khoury et al. |
| 2008/0133606 A1 | 6/2008 | Dang et al. |

FOREIGN PATENT DOCUMENTS

| | | |
|---|---|---|
| CN | 100411480 A | 7/2006 |
| CN | 1301469 C | 2/2007 |
| WO | 99/60807 A1 | 11/1999 |
| WO | WO 99/60807 A1 | 11/1999 |
| WO | WO 03/063458 A2 | 7/2003 |
| WO | 2004/064306 A2 | 7/2004 |
| WO | WO 2004/064306 A2 | 7/2004 |
| WO | WO 2005/039114 A1 | 4/2005 |

OTHER PUBLICATIONS

1st Office Communication from the European Patent Office in corresponding European Patent Application No. 06761332.3 (Oct. 30, 2009).

2nd Office Communication from the European Patent Office in corresponding European Patent Application No. 06761332.3 (Mar. 23, 2010).

1st Chinese Office Action from the Chinese Patent Office in corresponding Chinese Patent Application No. 2006800122816 (Jan. 22, 2010).

1st Chinese Office Action from the Chinese Patent Office in corresponding Chinese Patent Application No. 2005100356271 (Sep. 14, 2007).

Rejection from the Chinese Patent Office in corresponding Chinese Patent Application No. 2005100356271 (Jun. 6, 2008).

Office Action from the Korean Intellectual Property Office in corresponding Korean Patent Application No. 10-2008-7002003 (Aug. 17, 2009).

"Network Discovery and Selection," Apr. 14, 2005, WiMax Forum Network Working Group, Beaverton, Oregon.

Written Opinion from the International Searching Authority in corresponding PCT Application No. PCT/CN2006/001450 (Nov. 2, 2006).

* cited by examiner

METHOD AND APPARATUS FOR DISCOVERING NETWORK SERVICE PROVIDERS

CROSS-REFERENCE TO RELATED APPLICATIONS

The present application is a continuation of PCT Application No. PCT/CN2006/001521 filed on Jun. 30, 2006, which claims the priority of Chinese Patent Application No. 200510035627.1 filed on Jul. 1, 2005. All of these applications are incorporated herein by reference.

FIELD OF THE INVENTION

The present invention relates to access technology in wireless communication network, and more particularly to a method and an apparatus for discovering network service providers when accessing a wireless communication network.

BACKGROUND OF THE INVENTION

With the development of wireless communication technology, new network forms are continually emerging for wireless communication network, such as Worldwide Interoperability for Microwave Access Forum (WiMax) network and Wireless Local Area Network (WLAN) developing rapidly nowadays. Typically the wireless communication network includes Customer Premises Equipments (CPEs), Network Access Providers (NAPs) built by different operators, and Network Service Providers (NSPs). The WiMax network will be taken as an example in the following description, and the WiMax network based on the Institute of Electrical and Electronics Engineers (IEEE) 802.16 can provide relatively high access rate.

Figure 1:
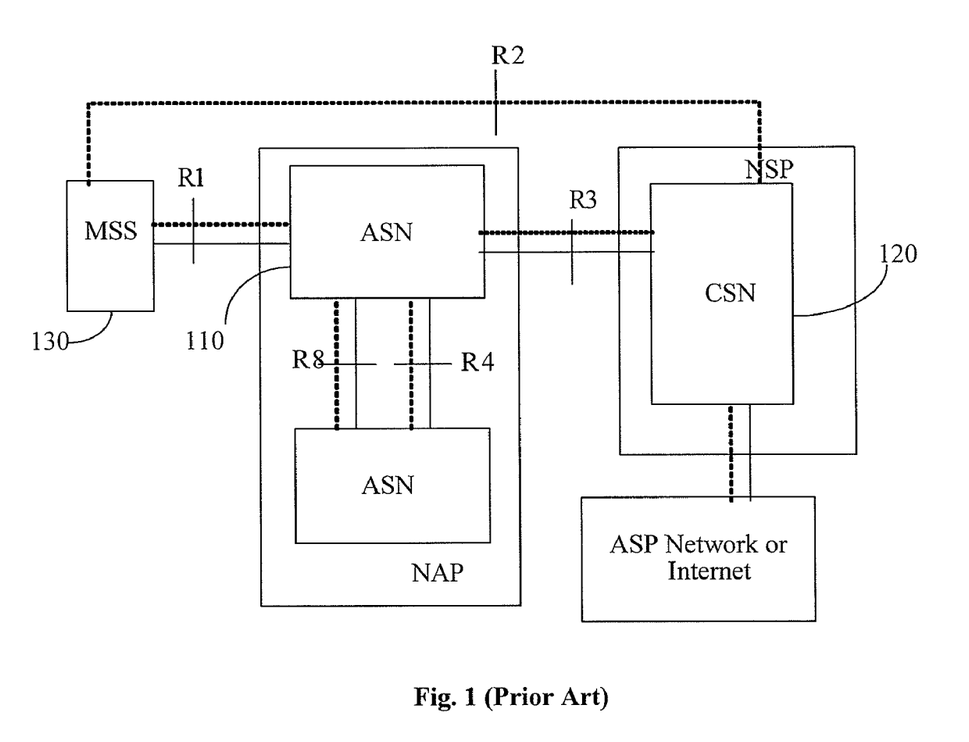
FIG. 1 is a schematic diagram illustrating a reference model for a WiMax network in the case of non-roaming in the prior art.

FIG. 1 is a schematic diagram showing a reference model of a WiMax network in the case of non-roaming. In the situation of non-roaming, an Access Service Network (ASN) 110 connects with a Connection Service Network (CSN) 120, and a Subscriber Station/Mobile Subscriber Station (SS/MSS) 130 accesses the CSN 120 through the ASN 110.

Figure 2:
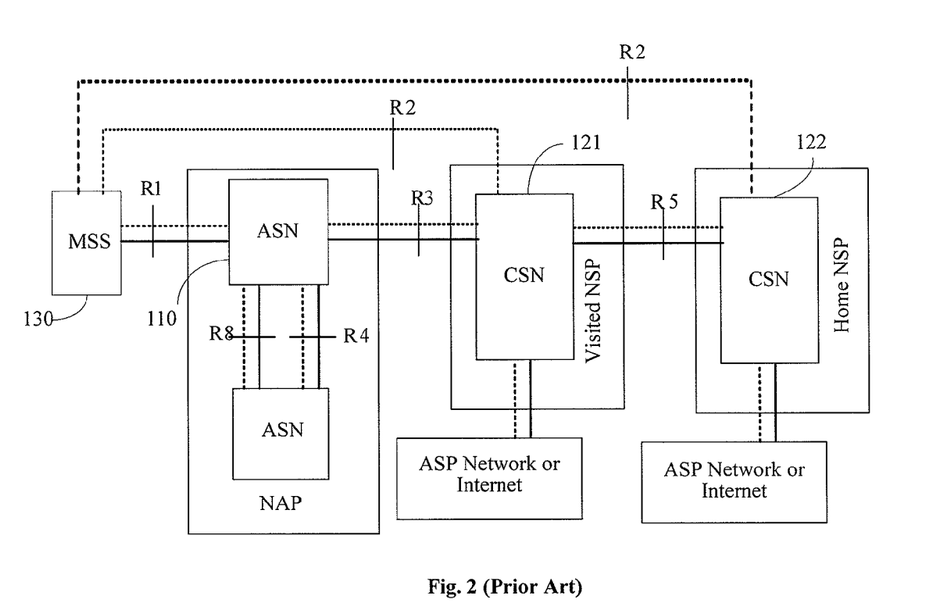
FIG. 2 is a schematic diagram illustrating a reference model for a WiMax network in the case of roaming in the prior art.

FIG. 2 is a schematic diagram showing a reference model of a WiMax network in the case of roaming. In the situation of roaming, an ASN 110 connects with a Visited Connection Service Network (Visited CSN) 121, and the Visited CSN 121 connects with a Home Connection Service Network (Home CSN) 122. An SS/MSS 130 gets authenticated at the Home CSN 122 through the ASN 110 and the Visited CSN 121, and uses services provided by the Visited CSN 121 and the Home CSN 122.

In general, ASN belongs to NAP and CSN belongs to NSP. In a practical deployment, NAP, Visited Network Service Provider (Visited NSP) and Home Network Service Provider (Home NSP) may be run by different operators, meanwhile there may be an overlapping area covered by multiple ASNs and each ASN may connect with several NSP networks. At present, there are two different deployment modes for WiMax network: one is NAP+NSP mode, i.e. the relationship between NAP and NSP is one-to-one, and the other is ASN sharing mode, i.e. there are roaming protocols between one ASN and multiple NSPs, and one ASN is shared by multiple NSPs.

Figure 3:
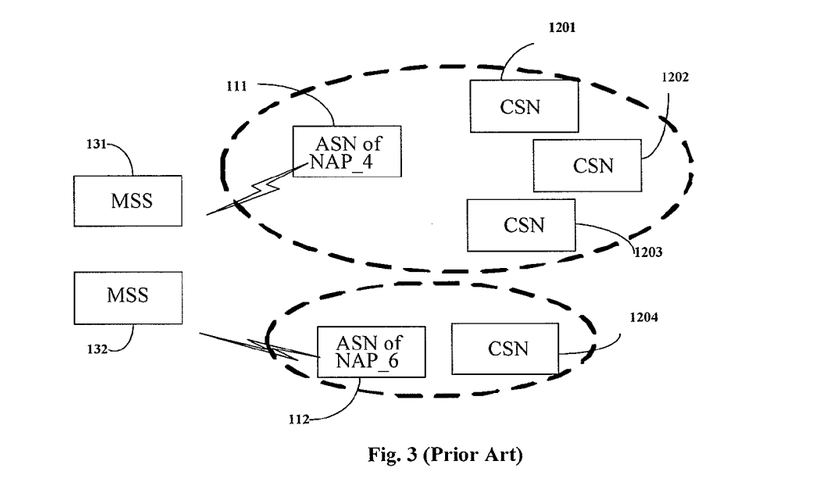
FIG. 3 is a schematic diagram illustrating a deployment mode of a WiMax network in the prior art.

FIG. 3 illustrates possible deployment modes for WiMax network.

ASN 111 of NAP_4 and ASN 112 of NAP_6 cover an overlapping area. CSN 1201 of NSP_1, CSN 1202 of NSP_2 and CSN 1203 of NSP_3 share the ASN 111 of the NAP_4; the ASN 112 of the NAP_6 and CSN 1204 of NSP_6 are bound together; SS/MSSes 131 and 132 access the network through the ASNs 111 and 112 respectively.

In the ASN sharing mode, CPE would encounter a problem: how to know by which NSPs the current ASN is shared, i.e. how to know which NSPs may be used through the current ASN. This is a problem regarding NSP selection present in a wireless communication network, i.e. how network-side provides information about the current available networks to the CPE, so that the CPE may further obtain information about all the NSPs accessible at the current position so as to select an NSP to access a network.

In the prior art, discovering NSPs in a wireless communication network is implemented by setting a broadcast message. For example, Service-Identity-Information is carried in a broadcast message, as specified in the current IEEE 802.16 protocol, and Base Station (BS) may use the broadcast message to broadcast the information about the accessible NSPs periodically on its own initiative. Table 1 shows information elements in the broadcast message.

TABLE 1

| Syntax | Size | Notes |
| --- | --- | --- |
| Service-Identity-Information format ( ) { | | |
| Management Message Type = To Be Assigned | 8 bits | |
| TLV encoded Information | Variables | TLV specifics (See Table 2) |
| } | | |

The TLV contained in the above broadcast message at least includes one or more NSP identities. NSP identity is defined in a TLV way as shown in Table 2.

TABLE 2

| Type | Length | Value |
| --- | --- | --- |
| To-Be-Assigned | To-Be-Defined | NSP identity |

According to this approach, when performing NSP discovery, an SS/MSS listens to the broadcast message from the BS and receives NSP information carried in the broadcast message transmitted by the BS periodically. If the waiting time is too long, the SS/MSS may also request the BS to broadcast the relevant NSP information by using the broadcast message. For example, the SS/MSS may request the BS to transmit the relevant broadcast message on its own initiative by carrying the information element as showed in Table 3 in a RNG-REQ message.

TABLE 3

| Type | Length | Value |
| --- | --- | --- |
| To-Be-Assigned | 1 | NULL character |

If the RNG-REQ message carries the above information element, then this means that the SS/MSS requests the BS to transmit the information about the supported NSP list; otherwise, there is no such a request.

The above method for implementing NSP discovery by transmitting NSP information by means of message broadcasting has the following problems:

Since one period is needed to broadcast an NSP list, the SS/MSS needs to wait for a period of time to receive the relevant broadcast message, which will cause a considerable delay; if the relevant broadcast message is transmitted during a short period of time, then more air interface resources are needed to transmit the relevant message, which will cause a waste of downlink air interface resource; and if the transmitting of the relevant broadcast message is requested by the SS/MSS, then a random access resource is occupied, which will cause a waste of uplink air interface resource.

SUMMARY OF THE INVENTION

The present invention provides a method and an apparatus for discovering NSPs, which can reduce extra occupancy of air interface resources in the process of accessing a network and time consumption in the process of discovering NSPs.

The present invention provides a method for discovering NSPs, which is used in a wireless communication network including CPEs, NAPs, and NSPs, and the method includes:

obtaining, by a CPE, first change information about NSPs supported by an NAP accessible at a current position when accessing the network, and the first change information being regularly transmitted by network-side;

when the first change information is consistent with stored change information about NSPs supported by the NAP, obtaining stored information about NSPs supported by the NAP; otherwise, obtaining information about NSPs supported by the NAP transmitted by the network-side;

adding the obtained information about the NSPs as information about available NSPs discovered.

In the method, second change information about NSPs supported by the NAP transmitted by the network-side is also obtained.

In the method, the network-side transmits the information about the NSPs supported by the NAP and the second change information at a fixed period or at the request of the CPE.

The method further includes storing the obtained information about NSPs supported by the NAP together with the obtained second change information about the NSPs.

In the method, the first change information is the same as the second change information.

In the method, obtaining the information about the NSPs supported by the NAP transmitted by the network-side and the second change information includes receiving an MAC layer management message, or a Downlink Channel Description (DCD) message, or a Neighbor Advertisement (NBR_ADV) message.

In the method, obtaining the first change information includes receiving a Downlink Mapping (DL_MAP) message.

The method further includes: obtaining an NAP identity transmitted by the network-side; obtaining the information about the NSPs supported by the NAP transmitted by the network-side when the NAP identity is not stored in the CPE; obtaining the first change information transmitted by the network-side when the NAP identity is stored in the CPE.

In the method, the CPE is a mobile subscriber station or a subscriber station.

Correspondingly, a network-side transmitting apparatus according to the present invention includes:

a first transmitting unit configured to transmit information about NSPs supported by a NAP at network-side;

a second transmitting unit configured to transmit first change information about NSPs supported by the NAP at a fixed period at the network-side;

wherein the first transmitting unit includes: an information transmitting unit configured to transmit the information about the NSPs supported by the NAP at the network-side; a change information transmitting unit configured to transmit second change information about the NSPs supported by the NAP at the network-side.

In the network-side transmitting apparatus, the first transmitting unit transmits the information about the NSPs supported by the NAP and the second change information at the network-side at a fixed period or at the request of the CPE.

In the network-side transmitting apparatus, the first transmitting unit transmits the information about the NSPs supported by the NAP and the second change information at the network-side through an MAC layer management message, or a DCD message, or an NBR_ADV message.

In the network-side transmitting apparatus, the second transmitting unit transmits the first change information about the NSPs supported by the NAP at the network-side through a DL_MAP message.

In the network-side transmitting apparatus, the first change information is the same as the second change information.

Correspondingly, a network discovering apparatus for a CPE according to the present invention includes:

a detecting and obtaining unit configured to detect and obtain first change information, being regularly transmitted by network-side, about NSPs supported by an NAP accessible at a current position when accessing a network;

a determining unit configured to determine whether the first change information is consistent with stored change information about NSPs supported by the NAP;

a first obtaining unit configured to obtain stored information about NSPs supported by the NAP when a determining result of the determining unit is YES;

a second obtaining unit configured to obtain information about NSPs supported by the NAP transmitted by the network-side when the determining result of the determining unit is NO;

a discovery adding unit configured to add the obtained information about the NSPs as information about available NSPs discovered.

The second obtaining unit includes: an information obtaining unit configured to obtain the information about the NSPs supported by the NAP transmitted by the network-side; a change information obtaining unit configured to obtain second change information about the NSPs supported by the NAP transmitted by the network-side.

Moreover, the network discovering apparatus further includes a storage unit configured to store the obtained information about the NSPs supported by the NAP together with the obtained second change information about the NSPs.

In the network discovering apparatus, the CPE is a mobile subscriber station or a subscriber station.

Compared with the prior art, the present invention has the following merits:

In the present invention, when a CPE accesses a network, the CPE obtains first change information regularly transmitted by network-side about NSPs supported by a NAP accessible at a current position, and performs the following operations according to whether the first change information regularly transmitted by network-side is consistent with the stored change information about NSPs supported by the NAP. For example, if it is consistent, the CPE obtains information about NSPs supported by the NAP stored at subscriber-side, otherwise receives information about NSPs supported by the NAP transmitted by the network-side. Since the information about the NSPs transmitted by the network-side is received according to the actual circumstance, extra occupancy of air interface resources when obtaining NSP information from the network-side is reduced. On the other hand, through the comparison of change information to determine whether it is necessary to update the NSP information, time consumption in the process of network discovering and selecting can generally be reduced effectively, while it can be ensured that the CPE will update and receive the NSP information timely.

DETAILED DESCRIPTIONS OF THE EMBODIMENTS

Typically, a CPE mentioned in the present invention is a mobile subscriber station (MSS) or a subscriber station (SS).

Generally, it takes 4 stages for a CPE to select an appropriate network to access:

Stage of discovering NAPs: an SS/MSS discovers all the NAP networks accessible at its current position (Coverage areas of the NAP networks include the current position of the SS/MSS).

Stage of discovering an NSP list for the current NAP: for each accessible NAP network, all the NSPs accessible through the NAP network are discovered.

Stage of obtaining all the currently available NSPs and selecting an NSP: all the NSPs that the SS/MSS can access at its current position are enumerated to generate a list, and an appropriate NSP is selected according to a certain rule.

Stage of performing a process of network accessing based on the selected NSP: according to the selected NSP, an appropriate NAP is selected (if one NSP can be accessed through two or more NAPs), and an initial access process is performed.

The improvement of the present invention mainly involves the stage of discovering NAPs and the stage of discovering an NSP list for the current NAP.

Figure 4:
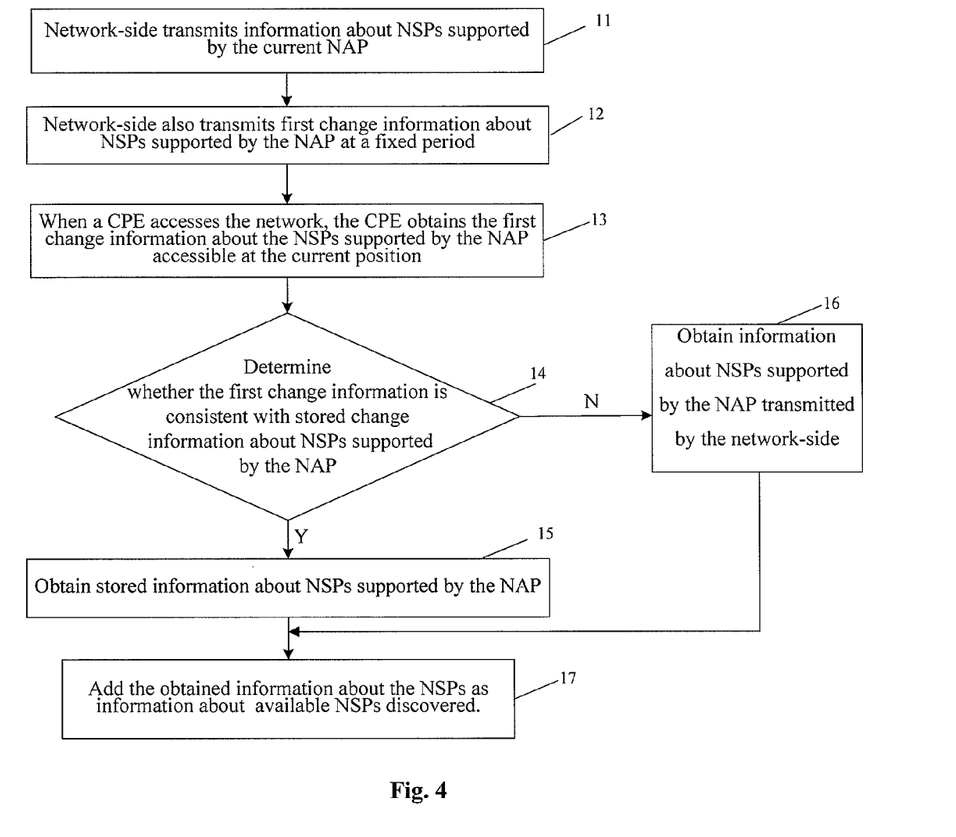
FIG. 4 is a flow chart illustrating a method for discovering NSPs according to the present invention.

FIG. 4 is a flow chart illustrating a method for discovering NSPs according to the present invention. In the present invention, information about NSPs supported by an NAP may be configured and stored at a CPE in advance, and when the CPE accesses a network, discovering NSPs mainly includes a network-side transmitting procedure and a CPE discovering procedure.

In a particular implementation, the network-side transmitting procedure mainly includes:

Block 11, network-side transmits information about NSPs supported by the current NAP;

Block 12, the network-side transmits first change information about NSPs supported by the current available NAP at a fixed period.

The CPE discovering procedure is illustrated below, and in a particular implementation, the CPE discovering procedure mainly includes:

Block 13, when a CPE accesses the network, the CPE obtains first change information about NSPs supported by an NAP accessible at the current position, the first change information being regularly transmitted by the network-side;

Block 14, the CPE determines whether the first change information is consistent with change information about NSPs supported by the NAP already stored in the CPE. If so, a process in block 15 is performed, otherwise a process in block 16 is performed;

Block 15, information about NSPs supported by the NAP already stored in the CPE is obtained and a process in block 17 is performed;

Block 16, information about NSPs supported by the NAP transmitted by the network-side is obtained;

Block 17, the obtained information about the NSPs is added as information about available NSPs discovered.

In the present invention, the network-side also transmits second change information about NSPs supported by the current NAP, and in a particular implementation, the information about the NSPs supported by the current NAP transmitted by the network-side is transmitted together with the second change information, and the transmitting may includes broadcasting at a fixed period or transmitting at the request of the CPE.

Moreover, in the present invention, the information about the NSPs supported by the NAP obtained from the network-side is stored together with the obtained second change information about the NSPs in the CPE, for the purpose of later network access and so on.

Hereinafter, the method is illustrated with specific examples.

Figure 5:
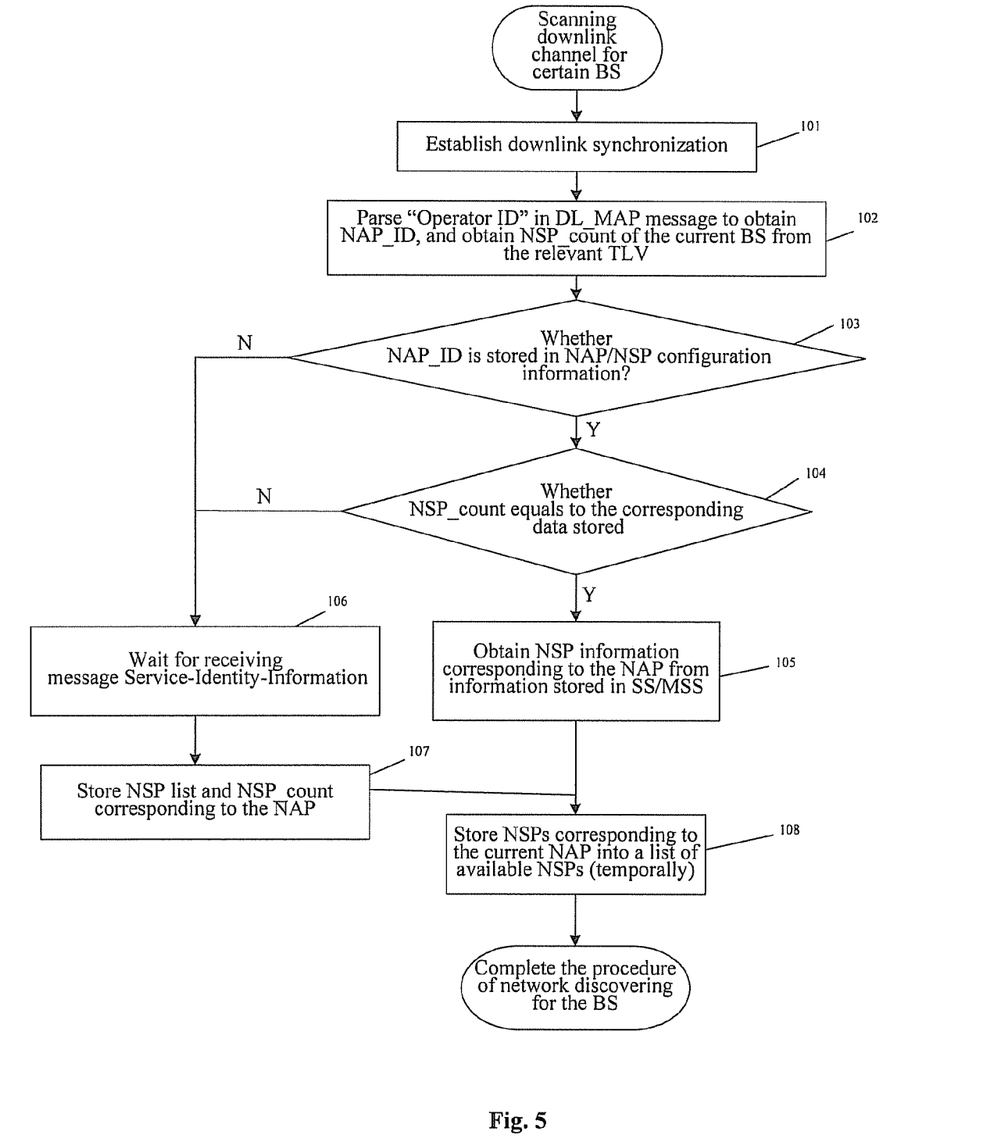
FIG. 5 is a flow chart illustrating the first embodiment of the method according to the present invention.

FIG. 5 is a flow chair illustrating the first embodiment of the method for discovering NSPs according to the present invention.

In the present embodiment, information about NSPs supported by an NAP is stored in an SS/MSS in the form of NAP/NSP configuration information.

In the embodiment of the present invention, an MAC layer management message Service-Identity-Information is added into IEEE 802.16, and a BS broadcasts the message periodically (e.g. once every 5 seconds). Information elements included in the message are shown in Table 4:

TABLE 4

| Syntax | Size | Notes |
|---|---|---|
| Service-Identity-Information format ( ) { | | |
|     Management Message Type = To Be Assigned | 8 bits | |
|     NSP-count | 8 bits | To reflect a change of information about an NSP list supported by the current NAP. The counter increments by 1 with the change of the information about the NSP list. |

TABLE 4-continued

| Syntax | Size | Notes |
|---|---|---|
| TLV encoded Information | Variables | TLV specifics (including the NSP list supported by the NAP that the current BS belongs to) |
| } | | |

Meanwhile, the BS adds one TLV in a DL_MAP message to reflect the change of information about the NSP list supported by the NAP that the current BS belongs to, and the TLV is defined in Table 5:

TABLE 5

| Type | Length | Value |
|---|---|---|
| To-Be-Assigned (NSP_count) | 1 | Consistent with the corresponding value in the Service-Identity-Information message |

After scanning a downlink channel for a certain BS, the SS/MSS needs to perform processes in the following blocks to obtain the NSP list supported by the NAP which the BS belongs to:

Block 101, the SS/MSS establishes downlink synchronization;

Block 102, the SS/MSS receives a DL_MAP message, obtains information about NAP_ID from "Operator ID", and obtains NSP_count from the added TLV;

Block 103, the SS/MSS determines whether the NAP_ID is stored in NAP/NSP configuration information stored by the SS/MSS. If so, the SS/MSS performs a process in block 104, otherwise the SS/MSS performs a process in block 106;

Block 104, the SS/MSS determines whether the NSP_count is consistent with that stored by the SS/MSS. If it is consistent, the SS/MSS performs a process in block 105, otherwise the SS/MSS performs a process in block 106;

Block 105, the SS/MSS extracts NSP information corresponding to the current NAP from the NAP/NSP configuration information stored by the SS/MSS, and performs a process in block 108;

Block 106, the SS/MSS further receives NAP/NSP configuration information in a broadcast message Service_Identity_Information;

Block 107, the SS/MSS stores the obtained NAP/NSP configuration information and the corresponding NSP_count into the NAP/NSP configuration information;

Block 108, the SS/MSS stores the NSPs corresponding to the current NAP into a list of available NSPs (temporally), and completes the procedure of network discovering for the BS in the end.

Figure 6:
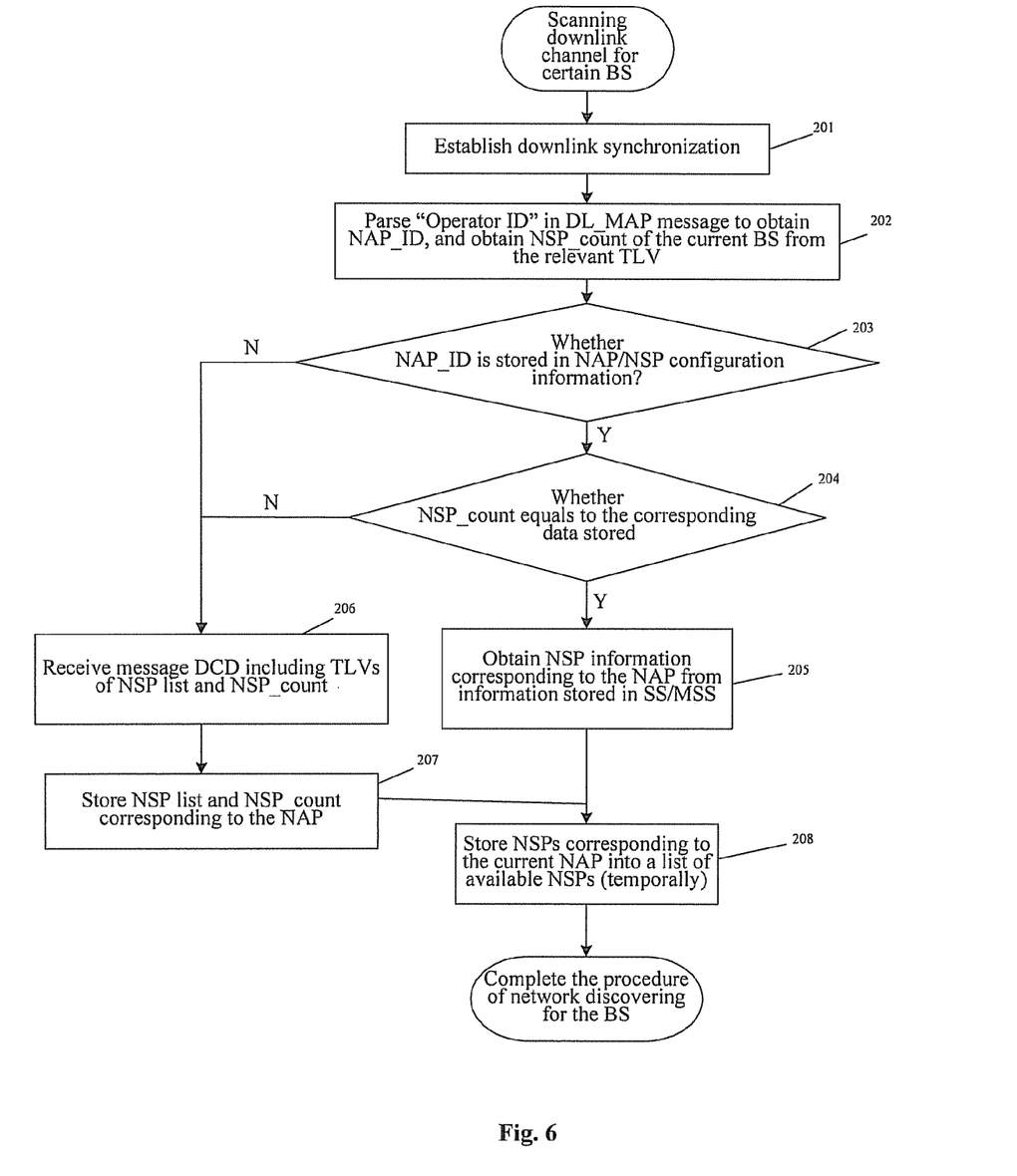
FIG. 6 is a flow chart illustrating the second embodiment of the method according to the present invention.

FIG. 6 is a flow chart illustrating the second embodiment of the method for discovering NSPs according to the present invention.

In the embodiment, information about NSPs supported by an NAP is stored in an SS/MSS in the form of NAP/NAP configuration information.

In IEEE 802.16, TLVs are added into the current Downlink Channel Description (DCD) message (or NBR_ADV message, and DCD message is taken as an example in the embodiment). The TLVs includes at least two TLVs to describe an NSP list supported by the current NAP and the corresponding NSP_count. The two TLVs is described in Table 6:

TABLE 6

| Type | Length | Value |
|---|---|---|
| To-Be-Assigned (NSP list) | Variable | TLV specifics (including an NSP list supported by an NAP that the current BS belongs to) |
| To-Be-Assigned (NSP_count) | 1 | To reflect a change of information about the NSP list supported by the current NAP. The counter increments by 1 with the change of the information about the NSP list. |

Meanwhile, the BS adds one TLV (i.e. the above-mentioned NSP_count) into a DL_MAP message to reflect the change of the information about the NSP list supported by the NAP which the current BS belongs to.

After scanning a downlink channel for a certain BS, the SS/MSS needs to perform processes in the following blocks to obtain the NSP list supported by the NAP that the BS belongs to:

Block 201, the SS/MSS establishes downlink synchronization;

Block 202, the SS/MSS receives a DL_MAP message, obtains information about NAP_ID from "Operator ID", and obtains NSP_count from the added TLV;

Block 203, the SS/MSS determines whether the NAP_ID is stored in NAP/NSP configuration information stored by the SS/MSS. If it is stored, the SS/MSS performs a process in block 204, otherwise the SS/MSS performs a process in block 206;

Block 204, the SS/MSS determines whether the NSP_count is consistent with that stored by the SS/MSS. If so, the SS/MSS performs a process in block 205, otherwise the SS/MSS performs a process in block 206;

Block 205, the SS/MSS extracts NSP information corresponding to the current NAP from the NAP/MSP configuration information stored by the SS/MSS and performs a process in block 208;

Block 206, the SS/MSS further receives a broadcast message DCD including TLVs of NSP list and NSP_count;

Block 207, the SS/MSS stores the obtained NAP/NSP configuration information and the corresponding NSP_count into the NAP/NSP configuration information;

Block 208, the SS/MSS stores NSPs corresponding to the current NAP into a list of available NSPs (temporally), and then completes the procedure of network discovering for the BS.

An apparatus for discovering NSPs according to another aspect of the present invention will be explained below.

Figure 7:
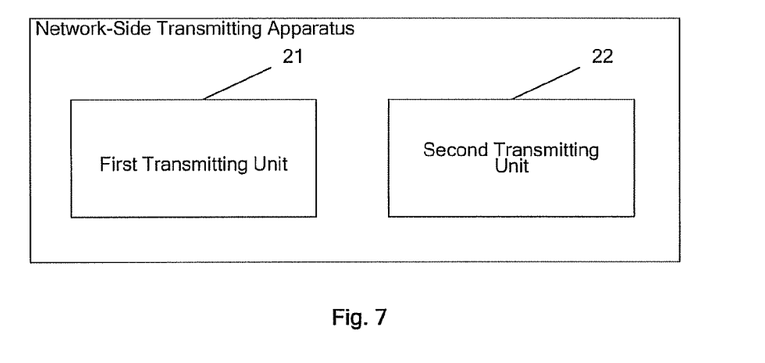
FIG. 7 is a schematic diagram illustrating the constitution of a network-side transmitting apparatus according to an embodiment of the present invention.

FIG. 7 is a schematic diagram illustrating an embodiment of a network-side transmitting apparatus according to the present invention.

The network-side transmitting apparatus according to the present invention includes:

a first transmitting unit 21 configured to transmit information about NSPs supported by an NAP at network-side; and a second transmitting unit 22 configured to transmit first change information about NSPs supported by the NAP at a fixed period at the network-side.

In a particular implementation, the first transmitting unit 21 may also transmit second change information about NSPs supported by the NAP. Depending on particular network change, the first change information and the second change information may be identical, or different with certain correspondence. Moreover, the first transmitting unit 21 transmits the information about the NSPs supported by the NAP and the second change information at the network-side at a fixed period or at the request of a CPE.

The first transmitting unit 21 includes: an information transmitting unit configured to transmit the information about the NSPs supported by the NAP at the network-side; a change information transmitting unit configured to transmit the second change information about the NSPs supported by the NAP at the network-side.

Moreover, as mentioned above, the first transmitting unit 21 transmits the information about the NSPs supported by the NAP and the second change information through an MAC layer management message, a DCD message or an NBR_ADV message at the network-side. The second transmitting unit 22 may transmit the first change information about the NSPs supported by the NAP through a DL_MAP message at the network-side.

Figure 8:
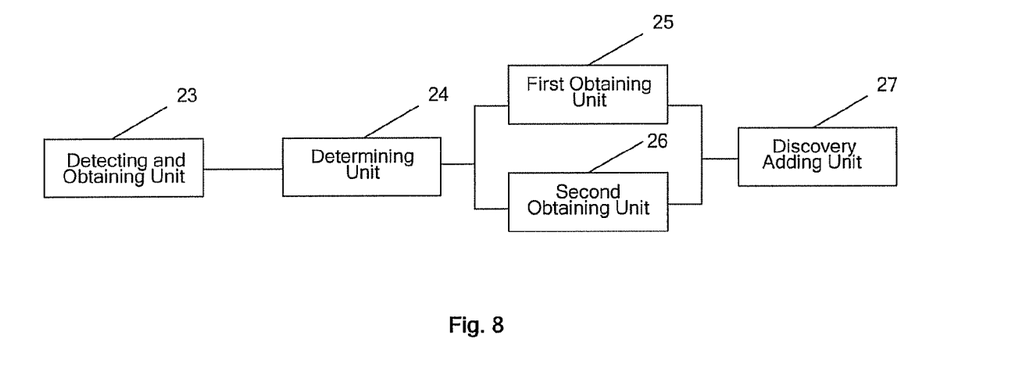
FIG. 8 is a schematic diagram illustrating the constitution of a network discovering apparatus for a CPE according to an embodiment of the present invention.

FIG. 8 is a schematic diagram illustrating an embodiment of a network discovering apparatus of a CPE according to the present invention.

The network discovering apparatus for the CPE according to the present invention includes:

a detecting and obtaining unit 23 configured to obtain first change information about NSPs supported by an NAP accessible at a current position when the CPE accesses a network, the first change information being regularly transmitted by network-side.

a determining unit 24 configured to determine whether the first change information is consistent with stored change information about NSPs supported by the NAP;

a first obtaining unit 25 configured to obtain stored information about NSPs supported by the NAP when a determining result of the determining unit is YES;

a second obtaining unit 26 configured to obtain information about NSPs supported by the NAP transmitted by the network-side when the determining result of the determining unit is NO;

a discovery adding unit 27 configured to add the obtained information about the NSPs as information about available NSPs discovered.

The second obtaining unit 26 includes: an information obtaining unit configured to obtain the information about the NSPs supported by the NAP transmitted by the network-side; a change information obtaining unit configured to obtain second change information about NSPs supported by the NAP transmitted by the network-side.

In order to update the information about the NSPs timely, the CPE according to the present invention also includes a storage unit configured to store the obtained information about the NSPs supported by the NAP together with the obtained second change information about the NSPs.

The above descriptions are only preferred embodiments according to the present invention, and they are not intended to limit the scope of the present invention. Any modification, equivalent substitution and improvement etc. made within the spirit and principle of the present invention should be encompassed in the scope of the claims of present invention.

What is claimed is:

1. A method for discovering network service providers (NSPs), which is used in a wireless communication network comprising customer premises equipments (CPEs), network access providers (NAPs) and NSPs, the method comprising:
    obtaining, by a CPE, from an NAP a downlink message including first change information about a plurality of NSPs supported by the NAP and an NAP identity transmitted by a network-side, wherein the NAP has direct connections to the plurality of NSPs, and wherein the NAP manages and inserts the first change information into the downlink message;
    determining whether the first change information matches change information about the plurality of NSPs stored in the CPE and whether the identity of the NAP is stored in the CPE;
    if the first change information matches the change information and the identity of the NAP is stored in the CPE, obtaining information about the plurality of NSPs pre-stored in the CPE;
    if the identity of the NAP is not stored in the CPE, and/or the first change information does not match the change information, obtaining, by the CPE, the information about the plurality of NSPs from the NAP; and
    determining the availability of the plurality of NSPs from the obtained information about the plurality of NSPs.

2. The method for discovering NSPs according to claim 1, further comprising:
    obtaining second change information about the plurality of NSPs transmitted by the network-side when obtaining the information about the plurality of NSPs transmitted by the network-side.

3. The method for discovering NSPs according to claim 2, wherein the network-side transmits the information and the second change information about the plurality of NSPs at a fixed period or at a request of the CPE.

4. The method for discovering NSPs according to claim 2, further comprising:
    storing the obtained information about the plurality of NSPs together with the obtained second change information about the plurality of NSPs; and taking the second change information about the plurality of NSPs as the stored change information about the plurality of NSPs.

5. The method for discovering NSPs according to claim 2, wherein the first change information is the same as the second change information.

6. The method for discovering NSPs according to claim 2, wherein the obtaining the information about the plurality of NSPs and the second change information about the plurality of NSPs comprises:
    receiving an MAC layer management message or a downlink channel description (DCD) message, or a neighbor advertisement (NBR_ADV) message transmitted by the network-side.

7. The method for discovering NSPs according to claim 1, wherein the obtaining the first change information comprises:
    receiving a downlink mapping (DL_MAP) message transmitted by the NAP.

8. The method for discovering NSPs according to claim 1, wherein the CPE is a mobile subscriber station or a subscriber station.

9. The method for discovering NSPs according to claim 1, wherein if the identity of the NAP is stored by the CPE and the first change information does not match the change information, obtaining, by the CPE, the information about the plurality of NSPs from the NAP.

10. A network discovering apparatus for a CPE, comprising:
- a detecting and obtaining unit configured to obtain an NAP identity transmitted by a network-side and detect and obtain first change information about a plurality of NSPs supported by an NAP when the CPE accesses a network, the first change information being transmitted by the NAP, wherein the NAP has direct connections to the plurality of NSPs, and wherein the NAP manages and inserts the first change information into a downlink message;
- a determining unit configured to determine whether the NAP identity is stored in the CPE or not, and determine whether the first change information is consistent with stored change information about the plurality of NSPs;
- a first obtaining unit configured to obtain stored information about the plurality of NSPs when a determining result of the determining unit is that the first change information is consistent with stored change information about the plurality of NSPs and the identity of the NAP is stored in the CPE;
- a second obtaining unit configured to obtain information about the plurality of NSPs transmitted by the network-side when the determining result of the determining unit is that the NAP identity is not stored in the CPE and/or the first change information is not consistent with stored change information about the plurality of NSPs;
- a discovery adding unit configured to determine the availability of the plurality of NSPs from the obtained information about the plurality of NSPs.

11. The network discovering apparatus for the CPE according to claim 10, wherein the second obtaining unit comprises:
- an information obtaining unit configured to obtain the information about the plurality of NSPs transmitted by the network-side;
- a change information obtaining unit configured to obtain second change information about the plurality of NSPs transmitted by the network-side.

12. The network discovering apparatus for the CPE according to claim 11, further comprising: a storage unit configured to store the obtained information about the plurality of NSPs together with the obtained second change information about the plurality of NSPs.

13. The network discovering apparatus for the CPE according to claim 10, wherein the CPE is a mobile subscriber station or a subscriber station.

14. The network discovering apparatus for the CPE according to claim 10, wherein the second obtaining unit is further configured to obtain information about the plurality of NSPs transmitted by the network-side when the determining result of the determining unit is that the NAP identity is stored in the CPE and the first change information is not consistent with stored change information about the plurality of NSPs.

* * * * *